US008433636B2

(12) United States Patent
Ng (10) Patent No.: US 8,433,636 B2
(45) Date of Patent: Apr. 30, 2013

(54) SYSTEMS AND METHODS FOR ANALYZING A STOCK

(75) Inventor: Chee We Ng, Shanghai (CN)

(73) Assignee: Open Financial Analytics Pte Ltd, Singapore (SG)

( * ) Notice: Subject to any disclaimer, the term of this patent is extended or adjusted under 35 U.S.C. 154(b) by 162 days.

(21) Appl. No.: 13/197,337

(22) Filed: Aug. 3, 2011

(65) Prior Publication Data

US 2013/0036070 A1 Feb. 7, 2013

(51) Int. Cl.
 *G06Q 40/00* (2012.01)
(52) U.S. Cl.
 USPC .................. 705/36 R; 705/35; 705/37
(58) Field of Classification Search .................... 705/35, 705/37
 See application file for complete search history.

(56) References Cited

U.S. PATENT DOCUMENTS

2005/0209944 A1* 9/2005 Ballow et al. .................. 705/35
2007/0294154 A1* 12/2007 Henninger ...................... 705/35

OTHER PUBLICATIONS

Strategic Review and Shareholder Return Sep. 2009 Fir M. Geenen Sohail Malad.*
www.oldschoolvalue.com valuation spreadsheet, web printed Jul. 7, 2011.
www.wikiwealth.com valuation spreadsheet, web printed Jul. 7, 2011.
www.trefis.com, web printed Jul. 7, 2011.

* cited by examiner

*Primary Examiner* — William Rankins
(74) *Attorney, Agent, or Firm* — Deepak Malhotra; Malhotra Law Firm, PLLC (57) ABSTRACT

A system for analyzing a security includes a processor; an input module configured to cause a graphical user interface to be rendered on a user's client machine, the interface including a graph of stock price versus trading dates, with price being indicated on a first axis and trading dates being indicated on a second axis, the interface being configured to input a first trading date by a user interacting with the graph and actuating on the graph in a location, along the second axis, representing the first trading date, the interface being configured to input a second trading date by a user interacting with the graph and actuating on the graph in a location, along the second axis, representing the second trading date; a return decomposition module configured to compute, using the processor, shareholder return between the first trading date and second trading date, and to decompose the shareholder return into: zero growth earnings yield, earnings and yield growth, capital needs for growth, change in price-earnings ratio, and timing differences; and an output module configured to display the decomposition on the user's client machine in the form of a chart. Other systems and methods, and computer readable media are disclosed.

20 Claims, 8 Drawing Sheets

| | HISTORICAL | | | FORECAST | | | | |
|---|---|---|---|---|---|---|---|---|
| | 2008 | 2009 | 2010 | 2011 | 2012 | 2013 | 2014 | 2015 |
| REVENUE GROWTH | | | | | | | | |
| REVENUE | | | | | | | | |
| NET INCOME MARGIN | | | | | | | | |
| NET INCOME | | | | | | | | |
| BOOK EQUITY / REVENUE | | | | | | | | |
| INCREMENTAL BOOK EQUITY / REVENUE | | | | | | | | |

84 — REVENUE GROWTH
86 — REVENUE
88 — NET INCOME MARGIN
90 — NET INCOME
92 — BOOK EQUITY / REVENUE
94 — INCREMENTAL BOOK EQUITY / REVENUE

FIG. 5

| | HISTORICAL | | | FORECAST | | | | |
|---|---|---|---|---|---|---|---|---|
| | 2008 | 2009 | 2010 | 2011 | 2012 | 2013 | 2014 | 2015 |
| REVENUE GROWTH | | | | | | | | |
| REVENUE | | | | | | | | |
| NOPAT MARGIN | | | | | | | | |
| NOPAT | | | | | | | | |
| INVESTED CAPITAL / REVENUE | | | | | | | | |
| INCREMENTAL INVESTED CAPITAL / REVENUE | | | | | | | | |
| CORPORATE DEBT | | | | | | | | |
| CORPORATE DEBT INTEREST RATE | | | | | | | | |
| MARGINAL TAX RATE FOR INTEREST RATE DEDUCTIONS | | | | | | | | |

84 — REVENUE GROWTH
86 — REVENUE
96 — NOPAT MARGIN
98 — NOPAT
100 — INVESTED CAPITAL / REVENUE
102 — INCREMENTAL INVESTED CAPITAL / REVENUE
104 — CORPORATE DEBT
106 — CORPORATE DEBT INTEREST RATE
108 — MARGINAL TAX RATE FOR INTEREST RATE DEDUCTIONS

SYSTEMS AND METHODS FOR ANALYZING A STOCK

TECHNICAL FIELD

The technical field comprises graphical user interfaces. The technical field also comprises technical analysis of securities.

BACKGROUND

Various embodiments relate to the analysis of stock prices historically. Various embodiments relate to the analysis of stock prices going forward.

Traditionally, these analyses are performed on computer spreadsheets, both offline versions such as Microsoft Excel and Open Office and online versions such as Google Docs and EditGrid. Interactivity is limited by the standard functionality of the spreadsheet application. In particular:
(a) Input to the spreadsheet is limited by entering numbers in a cell;
(b) Inputs to cells cannot be output at the same time; and
(c) Creating scenarios is cumbersome require custom programming or duplicating sheets.

Furthermore, traditional methods of analyzing stock prices focus on calculating and plotting charts such as stock prices (candlestick), price-earnings ratio, return on equity and others. Other analysis methods require tedious manipulation of spreadsheets to perform.

Finally, traditional methods of analyzing stock prices going forward focus on discounted cash flows, typically on a spreadsheet application. Seldom do they compute the expected return of the stock, and never is there a system that computes the breakdown of this return into the components above.

SUMMARY

Some embodiments provide systems and methods to compute the expected return of a stock or security. Some embodiments provide systems and methods for breaking down (decomposing) expected return of a stock into components such as at least two of zero-growth earnings yield, capital needs, earnings growth and price-earning ratios change.

Some embodiments provide systems and methods to perform at least one of the following: (1) analyze the decomposition of the stock return into its components for a publicly traded company between two user-selectable trading days; (2) calculate expected return of purchasing the stock going forward; and (3) calculate fair value of the stock.

Some embodiments provide systems and methods to allow a user to create scenarios and generate graphs that enable the user to understand the differences between different scenarios.

Some embodiments provide systems and methods that are interactive and not limited to the functionality of a spreadsheet.

In some embodiments, a user can select two historical trading dates interactively by picking them on a graph, and the stock return between these dates and decomposition of the return into components are calculated in response to the selecting.

In some embodiments, a user can calculate at least one of future expected return, decomposition of the expected return into components, and fair value of the stock in response to keying in numbers into different entries of a table, which automatically function as both outputs and inputs according to user input. In a spreadsheet implementation, rows are programmed as either inputs or outputs and not both.

In some embodiments, a user can calculate at least one of future expected return, decomposition of the expected return into components, and fair value of the stock in response to adjusting and selecting sliding points on a graph.

In some embodiments, a user can create scenarios to understand the sensitivity between inputs and outputs.

In some embodiments, calculations are made in response to a change of inputs. In some embodiments, one or more charts are rendered that enable a user to understand the analysis.

Some embodiments provide a system for analyzing a security, the system comprising a processor; an input module configured to cause a graphical user interface to be rendered on a user's client machine, the interface including a graph of stock price versus trading dates, with price being indicated on a first axis and trading dates being indicated on a second axis, the interface being configured to input a first trading date by a user interacting with the graph and actuating on the graph in a location, along the second axis, representing the first trading date, the interface being configured to input a second trading date by a user interacting with the graph and actuating on the graph in a location, along the second axis, representing the second trading date; a return decomposition module configured to compute, using the processor, shareholder return between the first trading date and second trading date, and to decompose the shareholder return into: zero growth earnings yield, earnings and yield growth, capital needs for growth, change in price-earnings ratio, and timing differences; and an output module configured to display the decomposition on the user's client machine in the form of a chart.

Some embodiments provide a system for analyzing a security, the system comprising a processor; an input module configured to cause a graphical user interface to be rendered on a user's client machine, the interface including a table including a plurality of cells respectably capable of being both an input and output, wherein the cells of the table include inputs for valuation of a security based on one of cash flow to equity holders and cash flow to both equity holders and debt holders; a forecast and valuation module configured to use inputs from the input module and to compute, using the processor, book value per share, value creation through a range of years up to a year N, value creation after year N, and total fair value per share; and an output module configured to render a graph of expected return decomposition broken down into zero growth earnings yield, capital needs for growth, earnings and yield growth, change in price-earnings ratio and timing differences, using inputs from the table.

Various combinations of these features are possible.

DETAILED DESCRIPTION OF THE ILLUSTRATED EMBODIMENTS

Attention is directed to U.S. patent application Ser. No. 12/853,541 filed Aug. 10, 2010, invented by the inventor hereof, titled "SYSTEMS AND METHODS FOR ENABLING CONTRIBUTORS TO CREATE AND SHARE FINANCIAL ANALYSIS," which is incorporated herein by reference. In some embodiments, some or all of the features described herein are integrated into or used in connection with some or all of the features of the system described in the incorporated patent application Ser. No. 12/853,541.

Figure 1:
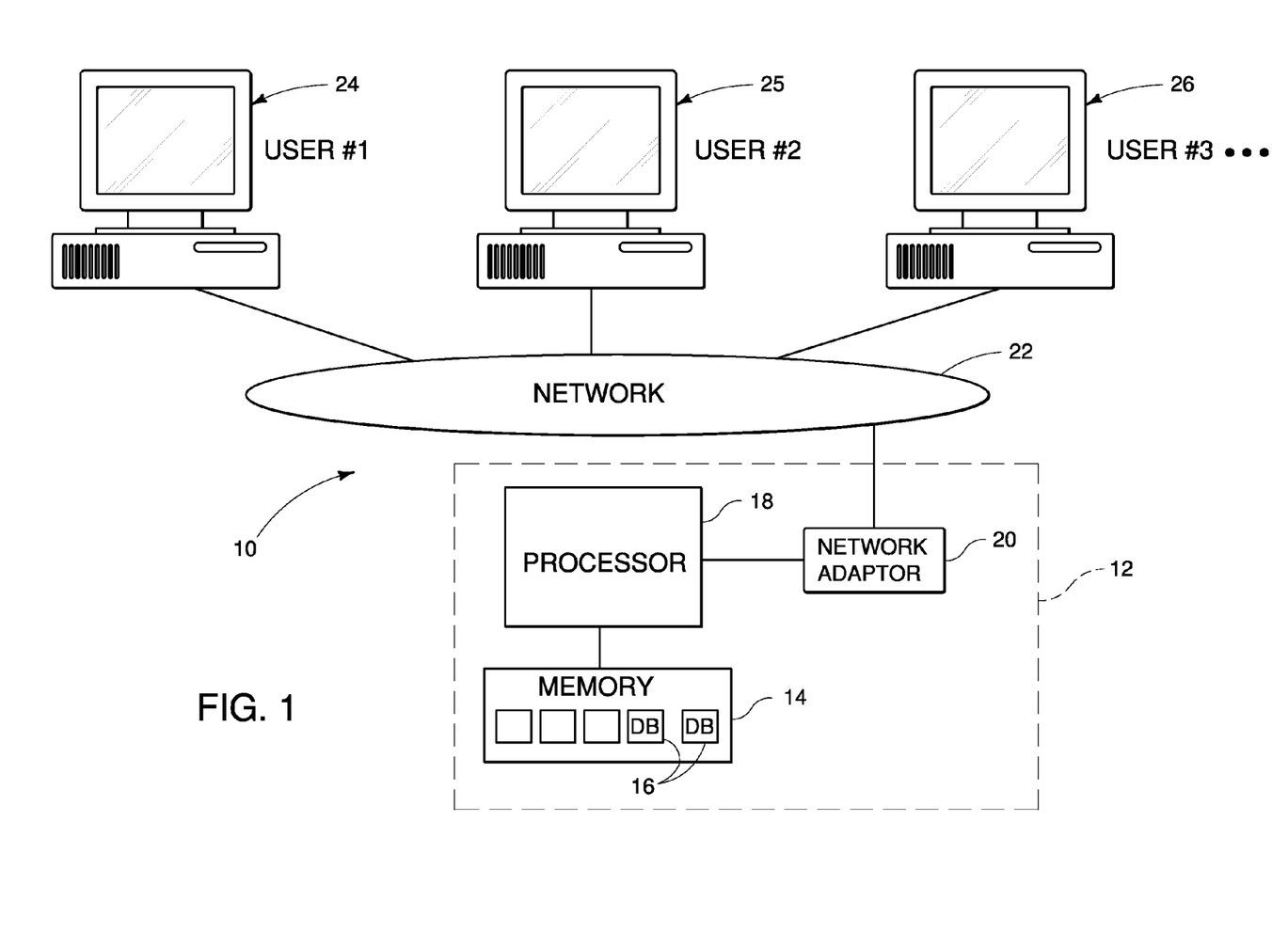
FIG. 1 is a block diagram of a system in accordance with various embodiments.

FIG. 1 shows a platform or system 10 in accordance with various embodiments. The system 10 includes a server 12 including memory 14 defining one or more databases 16. The database or databases 16 store data. The server 12 also includes one or more processors 18 in communication with the memory 14. The server 12 also includes one or more network adapters 20 enabling communication with a network 22 such as the Internet. Users use terminals or client computers 24, 25, 26, etc. to communicate with the server 12. An application delivered online or offline from the server 12 to the terminals 24, 25, 26 performs the analysis described in this disclosure.

Figure 2:
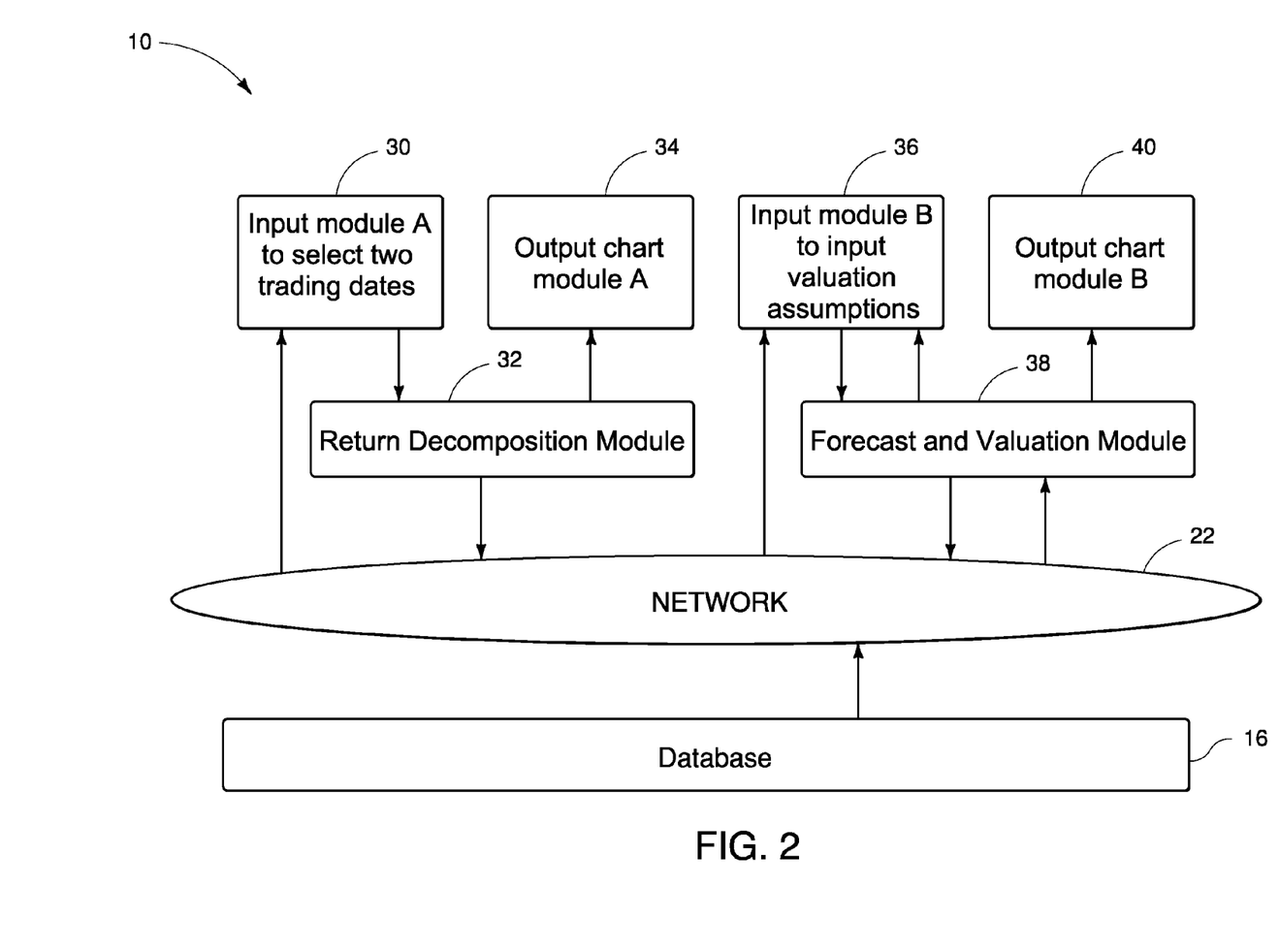
FIG. 2 is functional block diagram of the system of FIG. 1, in accordance with various embodiments.

FIG. 2 illustrates that the system 10, in various embodiments comprises various modules. The modules comprise, in various embodiments, an input module 30 using which a user can select two trading dates. The modules further comprise, in various embodiments, a return decomposition module 32 that computes total shareholder returns between the two dates and decomposes the total shareholder return into components. In the illustrated embodiment, the module 32 decomposes total shareholder return into: (1) zero growth earnings yield, (2) earnings and yield growth, (3) capital needs for growth, (4) change in price-earnings ratio and (5) timing differences. The modules further comprise, in various embodiments, an output chart module 34 that outputs the breakdown (decomposition performed by module 32) in the form of a chart, such as a waterfall chart. The modules further comprise, in various embodiments, an input module 36 that enables a user to input or change assumptions for a valuation. The modules further comprise, in various embodiments, a forecast and valuation module 38 that computes forecast and fair value in response to the inputs of the input module 36. The modules further comprise, in various embodiments, an output chart module 40 that outputs the forecast and fair value (calculation performed by module 38) in the form of a chart, such as a waterfall chart.

Figure 3:
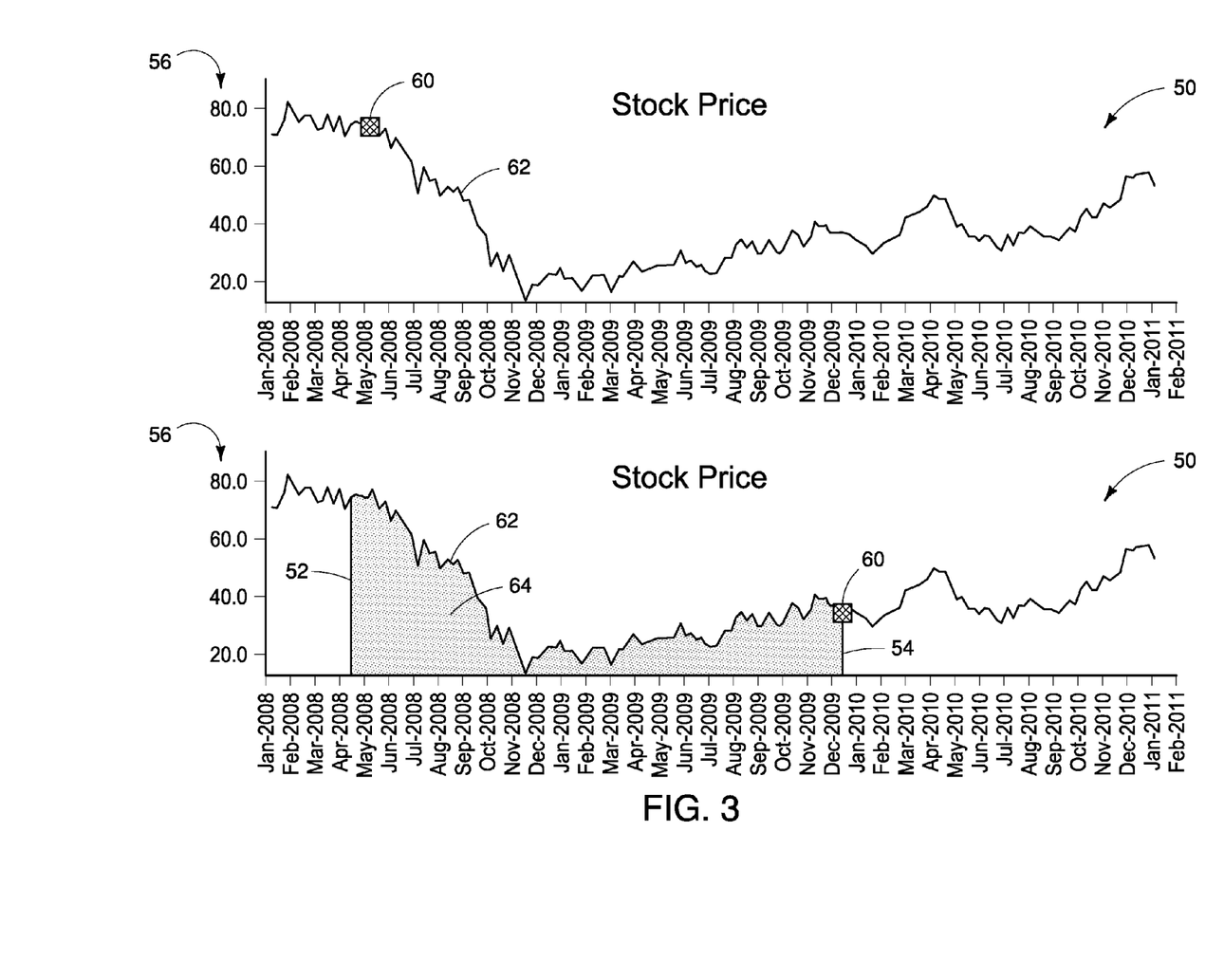
FIG. 3 illustrates a graphical user interface, generated by the system of FIG. 1, for selecting two trading dates, in accordance with various embodiments.

FIG. 3 shows a user interface 50 defining at least a portion of input module 30 to select two trading dates 52 and 54, in accordance with various embodiments. In the illustrated embodiment, closing stock prices 56 are plotted against time 58. A cursor shape 60 (a square in the illustrated embodiment) follows a user's mouse (or trackpad or other mouse equivalent) along the price curve 62 until a first click by the user. A first click or actuation by a user chooses the first selected trading date 52. After the first click, the cursor shape continues to follow the user's mouse along the price curve 62 as the user moves the mouse. In the illustrated embodiment, the area between the first selected trading date and the cursor are highlighted, shaded, or otherwise indicated 64 to show the period between the two trading dates. A second click by the user selects the second trading date 54. In other embodiments, keyboard strokes or touchscreen touches are used to move the cursor shape and select the first and second trading dates 52 and 54.

In the illustrated embodiment, the user interface shown in FIG. 3 is implemented in Javascript using a standard Javascript library such as Dojo. Other embodiments are possible. The user interface can then run on a web-browser (such as Internet Explorer) using Javascript, on a user terminal or computer 24, 25, or 26. In these embodiments, the terminal 24, 25, or 26 interacts with server 12. In other embodiments, a stand-alone version is downloaded from the server 12 or installed from a computer readable storage medium. In the stand-alone version, the user interface is implemented in a computer language such as C++ and compiled to an executable or in a computer language such as visual basic to run in a spreadsheet such as excel.

Traditional return decomposition decomposes total annualized shareholder return into dividends and capital gains. The module 32, on the other hand, decomposes total annualized shareholder return in the following manner.

First, total annualized shareholder return is calculated using an Internal Rate of Return (IRR) function where IRR for a set of cash flows CF(t) is defined as the rate of return r that satisfies the following equation:

$$\sum_t \frac{CF(t)}{(1+r)^t} = 0$$

Calculation of IRR is known in the art so will not be described in great detail.

The set of cash flows CF(t) are described as follows.

$$CF(0) = -ME(t_1)$$

$$CF(T_i - t_1) = NI(T_i) - BE(T_i) + BE(T_{i-1})$$

$$CF(t_2 - t_1) = ME(t_2)$$

where:

$t_1$ and $t_2$ are the two chosen trading dates $T_i$ are dates where annual reports of the company are announced, annually or quarterly between $t_1$ and $t_2$.

ME(t) represents the market value of equity of the company at time $t_1$ $NI(T_i)$ is the net income of the company announced on date $T_i$ $BE(T_i)$ is the book equity of the company announced on date $T_i$ Earnings and Net Income are used interchangeably herein.

The following is considered to provide an approximation of the more accurate calculation of total return:

$$t_1-t_2\sqrt{\frac{CF(t_2-t_1)+\sum_i CF(T_i-t_1)}{CF(0)}}$$

Where the units of $t_1$ and $t_2$ are in years.

In various embodiments, the formulas used for total annualized shareholder return between two trading dates $t_1$ and $t_2$, and for its decomposition into its five components are as follows:

TABLE 1

| Term | Formula |
|---|---|
| Total Annualized Shareholder Return | $IRR[CF(t)]$ |
| No Growth Earnings Yield | $\dfrac{NI_0}{ME_0}$ |
| Capital Needs | $-\left(\sqrt[n]{\dfrac{BE_n}{BE_0}}-1\right)\cdot\dfrac{BE_0}{ME_0}$ |
| Earnings Growth | $\left(\sqrt[n]{\dfrac{NI_n}{NI_0}}-1\right)\cdot\left(1+\dfrac{NI_0}{ME_0}\right)$ |
| Change in Price-earnings ratio | $\left(\sqrt[n]{\dfrac{ME_n}{ME_0}}-\sqrt[n]{\dfrac{NI_n}{NI_0}}\right)$ |
| Timing Difference | $IRR[CF(t)]-\dfrac{NI_0}{ME_0}+\left(\sqrt[n]{\dfrac{BE_n}{BE_0}}-1\right)\cdot\dfrac{BE_0}{ME_0}-\left(\sqrt[n]{\dfrac{NI_n}{NI_0}}-1\right)\cdot\left(1+\dfrac{NI_0}{ME_0}\right)-\left(\sqrt[n]{\dfrac{ME_n}{ME_0}}-\sqrt[n]{\dfrac{NI_n}{NI_0}}\right)$ | where $NI_0$, $ME_0$ and $BE_0$ are the latest announced Net Income, Market Value of Equity, and Book Value of Equity prior to selected trading date $t_1$;

$NI_n$, $ME_n$ and $BE_n$ are the latest announced Net Income, Market Value of Equity, and Book Value of Equity prior to selected trading date $t_2$;

n is the number of years between two announcement dates;

No Growth Earnings Yield is the return if the company were to continue operating at the same earnings without requiring additional capital;

Capital Needs is an annualized measure of how much of the earnings yield needs to be retained as growth capital to generate the earnings growth between the two trading dates;

Earnings Growth is an annualized measure of the impact of earnings growth between the two chosen trading dates on earnings yield and capital gains;

Change in Price-earnings Ratio is an annualized measure of the impact of change in price-earnings ratio between the two chosen trading dates; and Timing Difference is the difference between the total annualized shareholder return and the other four major drivers. Usually, Timing Difference is small. Other embodiments may lump Timing Difference together with Capital Needs.

In the illustrated embodiment, the calculations of Table 1 are implemented in Javascript using a standard Javascript library such as Dojo. Other embodiments are possible. The calculations can then run on a web-browser (such as Internet Explorer) using Javascript, on a terminal 24, 25, or 26. In these embodiments, the terminal 24, 25, or 26 interacts with server 12. In other embodiments, a stand-alone version is downloaded from the server 12 or installed from a computer readable storage medium. In the stand-alone version, the calculations of Table 1 are implemented in a computer language such as C++ and compiled to an executable or in a computer language such as visual basic to run in a spreadsheet such as excel.

Figure 4:
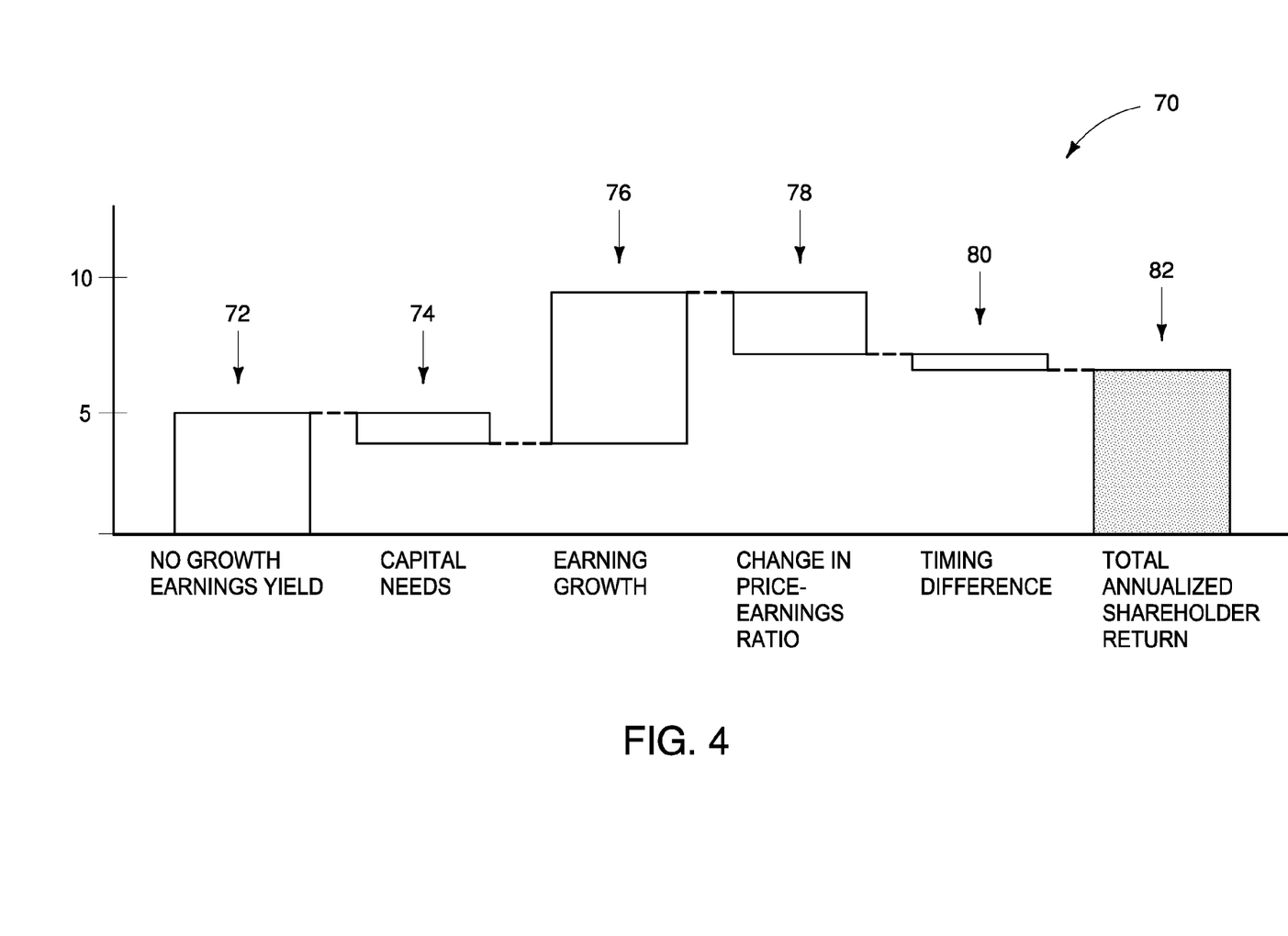
FIG. 4 is a graph, generated by the system of FIG. 1, showing decomposition of annualized shareholder return, in accordance with various embodiments.

FIG. 4 illustrates a waterfall chart 70 that is rendered by output chart module 34, using the results computed by the return decomposition module 32 in various embodiments.

The chart 70 shows no growth earnings yield 72, capital needs 74, earnings growth 76, change in price-earnings ratio 78, timing difference 80, and total annualized shareholder return 82.

In the illustrated embodiment, the chart 70 is implemented in Javascript using a standard Javascript library such as Dojo to achieve a real-time update as the two trading dates $t_1$ and $t_2$ are chosen. Other embodiments are possible. The chart can then run on a web-browser (such as Internet Explorer) using Javascript, on a terminal 24, 25, or 26. In these embodiments, the terminal 24, 25, or 26 interacts with server 12. In other embodiments, a stand-alone version is downloaded from the server 12 or installed from a computer readable storage medium. In the stand-alone version, the chart 70 is implemented in a computer language such as C++ and compiled to an executable or in a computer language such as visual basic to run in a spreadsheet such as excel.

An advantage of this decomposition is that it breaks down total shareholder return into drivers of value creation and capital gains, which are earnings, growth and market sentiment. Price-earnings ratio is a popular measure of market sentiment.

The advantage of various embodiments is that a user can understand the sources of investment return between any two trading dates. Traditional forms of analysis require the use of spreadsheets and specific spreadsheet manipulation and calculation for every two chosen dates.

Figure 5:
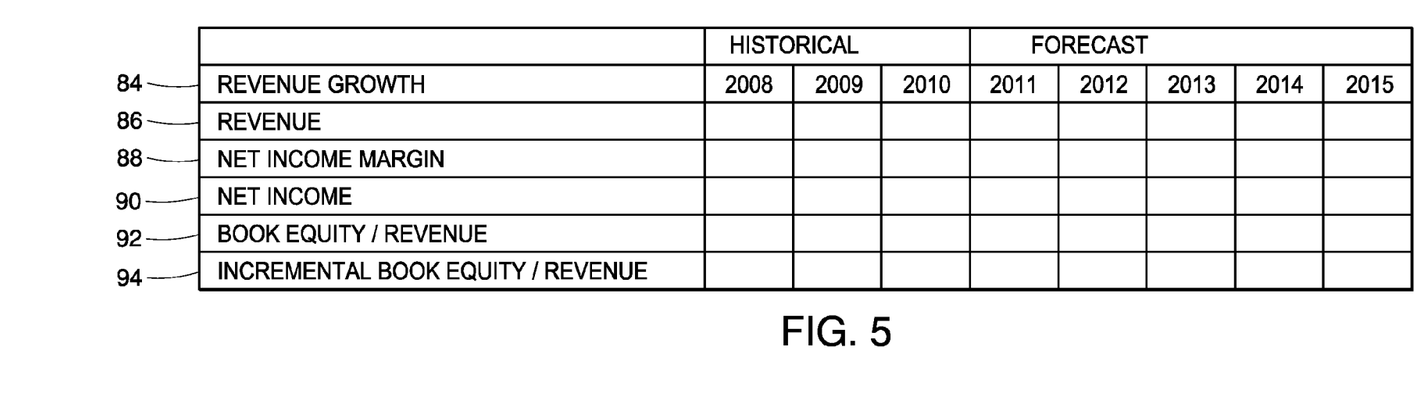
FIG. 5 illustrates a graphical user interface, generated by the system of FIG. 1, for providing or adjusting inputs for valuation, in accordance with various embodiments.
Figure 6:
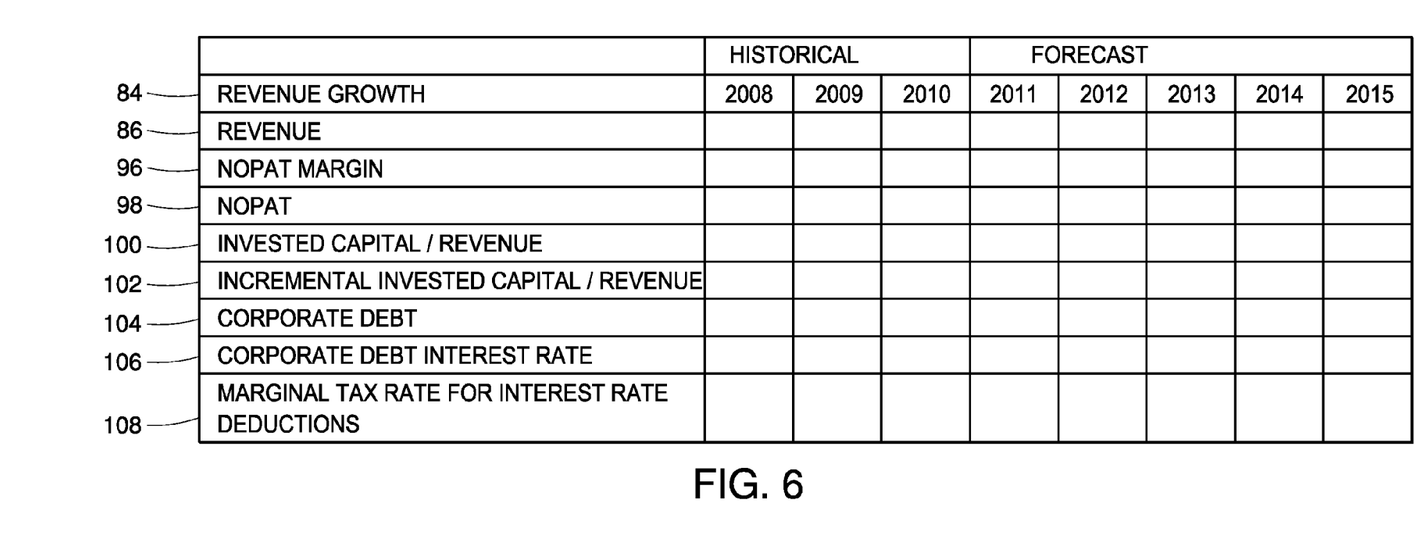
FIG. 6 illustrates an alternative graphical user interface, generated by the system of FIG. 1, for providing or adjusting inputs for valuation, in accordance with various embodiments.

FIGS. 5 and 6 show inputs for developing a valuation, in two alternative embodiments, where there are a number of historical years with actual historical data and a number of forecast years. In various embodiments, the inputs shown, or some subcombination or variation are used. In various embodiments, the inputs of FIG. 5 or 6, whichever is used, are implemented in Javascript using a Javascript library such as Dojo. In these embodiments, the terminal 24, 25, or 26 interacts with server 12. In other embodiments, a stand-alone version is downloaded from the server 12 or installed from a computer readable storage medium. In the stand-alone version, the inputs are implemented in a computer language such as C++ and compiled to an executable or in a computer language such as visual basic to run in a spreadsheet such as excel. Typically, there are at least 5 years of forecast. NOPAT stands for Net Operating Profit After Taxes.

FIGS. 5 and 6 show inputs for different methods of valuing a company. FIG. 5 (Alternative I) focuses on cash flows to equity holders only, whereas FIG. 6 (Alternative II) focuses on cash flows to both equity and debt holders. These two methods have different inputs but derive the same outputs.

The inputs of FIG. 5 are historical and forecast numbers for Revenue Growth 84, Revenue 86, Net Income Margin 88, Net Income 90, Book Equity÷Revenue 92, and Incremental Book Equity÷Revenue 94. The inputs of FIG. 6 are historical and forecast numbers for Revenue Growth 84, Revenue 86, NOPAT Margin 96, NOPAT 98, Invested Capital/Revenue 100, Incremental Invested Capital÷Revenue 102, Corporate Debt 104, Corporate Debt Interest Rate 106, and Marginal Tax Rate For Interest Rate Deductions 108. It should be understood that the symbol "/" when used in equations or in the figures means "divided by" and that symbol will be used hereinafter.

In various embodiments, for FIGS. 5 and 6, historical data is downloaded or preloaded. For forecast data, some default or base scenarios can be preloaded.

Typical default base scenario are:

GDP type (3-5%) revenue growth;

NOPAT margins or net income margins set to historical average for a set number of years (e.g. 5) in the past;

Invested Capital/revenue or Book Equity/revenue set to its historical average for a set number of years (e.g. 5) in the past; or Incremental Invested Capital/revenue or Incremental Book Equity/revenue set to its historical average for a set number of years (e.g. 5) in the past.

Traditional implementations of the above are done in a spreadsheet program such as Microsoft Excel. The disadvantage is each row or cell only be either an output or an input. For instance, one can choose Revenue Growth to be an input, and Revenue is determined as follows:

Revenue[$n$]=Revenue[$n-1$]×(1+RevenueGrowth[$n$])

Similarly, if Net Income Margin were chosen as an input, then Net Income is an output:

NetIncome[$n$]=Revenue[$n$]×NetIncomeMargin[$n$]

A disadvantage of traditional implementation is that if a user has a value in mind for an output cell, he/she has to either use a calculator to solve what the input has to be, or he has to use trial and error on the input cell.

Another disadvantage of traditional implementation is that in some scenarios, using one row as input is easier or better than using the alternative corresponding row. In other scenarios, the opposite is true. For instance, in many situations, modeling based on Book Equity/Sales as an input is better, but in other situations, modeling based on Incremental Book Equity/Sales as an input is better. In traditional implementation, this would have to be done in two separate spreadsheets.

In various embodiments, FIGS. 5 and 6 allow cells of both rows to be inputs and outputs at the same time.

In various embodiments, using a event handler function, if a Revenue[n] cell is edited, then the RevenueGrowth[n] cell is updated as follows:

RevenueGrowth[$n$]=Revenue[$n$]/Revenue[$n-1$]−1

If a Revenue Growth[n] cell is edited, then the Revenue[n] cell is updated as follows:

Revenue[$n$]=Revenue[$n-1$]×(1+RevenueGrowth[$n$])

Similarly, if a NetIncome[n] cell is edited, then the NetIncomeMargin[n] cell is updated as follows:

NetIncomeMargin[$n$]=NetIncome[$n$]/Revenue[$n$]

If NetIncomeMargin[n] cell is updated, NetIncome[n] cell is updated as follows:

NetIncome[$n$]=Revenue[$n$]×NetIncomeMargin[$n$]

If BookEquityPerRevenue[n] cell is updated, IncrementalBookEquityPerRevenue[n] is calculated as follows:

BookEquity[$n$]=BookEquityPerRevenue[$n$]×Revenue[$n$]

IncrementalBookEquityPerRevenue[$n$]=(BookEquity[$n$]−BookEquity[$n-1$])/Revenue[$n$]

If IncrementalBookEquityPerRevenue[n] cell is updated, BookEquityPerRevenue[n] is calculated as follows:

BookEquity[$n$]=BookEquity[$n-1$]+Revenue[$n$]×IncrementalBookEquityPerRevenue[$n$]

BookEquityPerRevenue[$n$]=BookEquity[$n$]/Revenue[$n$]

Figure 7:
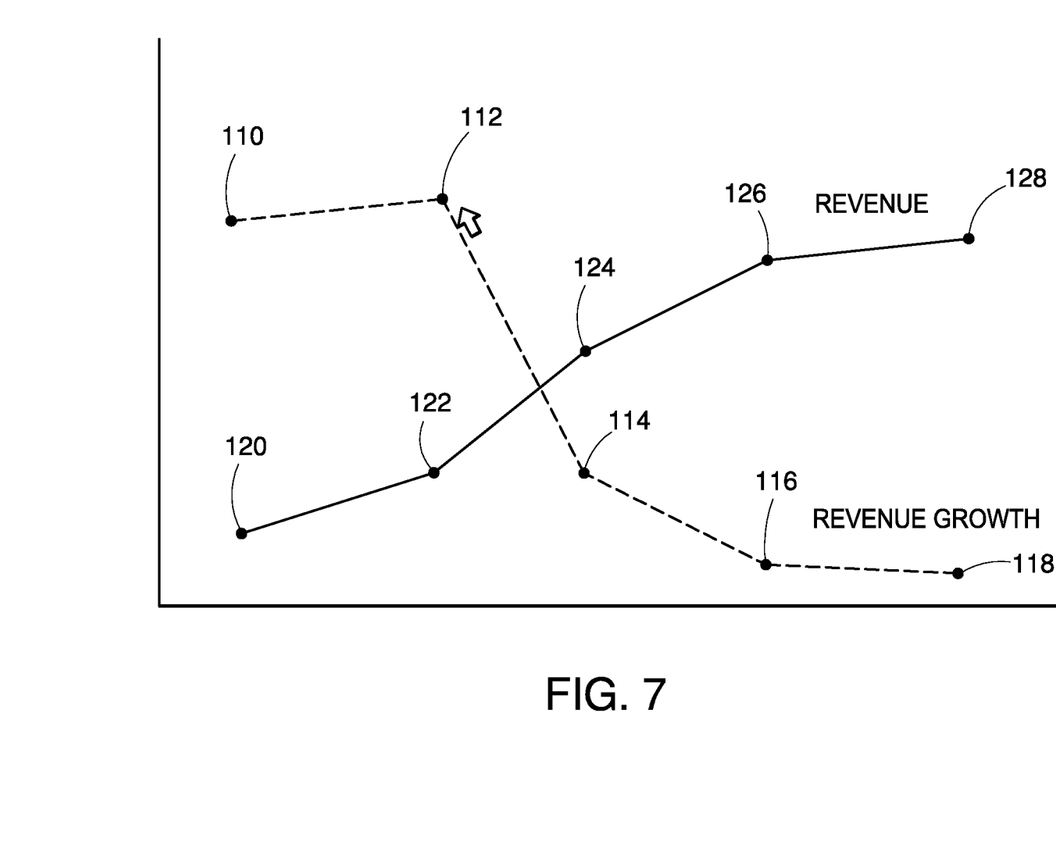
FIG. 7 illustrates a graphical user interface, generated by the system of FIG. 1, for adjusting one or more inputs on a graph, in accordance with various embodiments.

Some alternative embodiments provide for the use of interactive graphs which do not exist in implementations that use spreadsheets. FIG. 7 shows how points can be edited interactively on a graph.

By using a Dojo-Javascript library, points 110, 112, 114, 116, and 118 of Revenue Growth and points 120, 122, 124, 126, and 128 of Revenue are plotted on the graph shown in FIG. 7. Using an event handler, the points of Revenue can be moved by the user, with the data values automatically updated in the table and also the Revenue Growth values back-calculated as explained in the previous paragraphs. Likewise for Revenue Growth. Various embodiments include similar features for Net Income, Net Income Margin, Book Equity/Sales and Incremental Book Equity/Sales.

The equations for the Alternative II method of valuation are as follows:

NOPATMargin[$n$]=NOPAT[$n$]/Revenue[$n$]

NOPAT[$n$]=NOPATMargin[$n$]×Revenue[$n$]

NetIncome[$n$]=NOPAT[$n$]×CorporateDebt[$n$]×InterestRate[$n$]×(1−TaxRate[$n$])

InvestedCapital[$n$]=Invested CapitalPerRevenue[$n$]×Revenue[$n$]

IncrementalInvestedCapitalPerRevenue[$n$]=(InvestedCapital[$n$]−InvestedCapital[$n-1$])/Revenue[$n$]

BookEquity[$n$]=InvestedCapital[$n$]−Debt[$n$]

This implementation, in various embodiments converts the Alternative II method of valuation to a common basis as Alternative I. This enables the calculations of future value per share, future price-earnings ratio and expected return decomposition. Other inputs used for valuation are as shown below:

TABLE 2

| Variable | Meaning |
| --- | --- |
| $r_e$ | Cost of Equity |
| RONE | Incremental Return on Equity for Perpetuity Period |
| g | Growth rate for Perpetuity Period |
| Shares | Number of outstanding shares today |

In some embodiments, these are input in the input module using an ordinary text box. Various embodiments allow the input of multiple scenarios for comparison across different inputs.

The forecast and valuation module 38 of FIG. 2 will now be described.

I. Computing the Forecast

Assuming Revenue Growth, Net Income Margin and Equity/Revenue are the inputs, the forecast is computed using the following equations:

Revenue[$n$]=(1+RevenueGrowth[$n$])×Revenue[$n$−1];

NetIncome[$n$]=NetIncomeMargin[$n$]×Revenue[$n$];

BookEquity[$n$]=EquityPerRevenue[$n$]×Revenue[$n$];

FCF[$n$]=NetIncome[$n$]−Equity[$n$]+Equity[$n$−1];

AE[$n$]=NetIncome[$n$]−Equity[$n$−1]×$r_e$;

for n=1, 2 ... N where n=1 refers to the first year of the forecast, and n=N refers to the final year of the forecast; and FCF refers to Free Cash Flow and AE refers to Abnormal Earnings, which is also known as Residual Earnings.

It was described above how we can have other corresponding rows as inputs.

II. Computing Future Value Per Share

Future value per share is computed as follows:

$$FV = \frac{NetIncome[N] \times (1+g) \times \left(1 - \frac{g}{RONE}\right)}{(r_e - g) \times Shares}$$

where N is the index of the final year of the forecast.

Future price-earnings and price-book ratios are calculated as follows:

$$FuturePE = \frac{FV \times Shares}{NetIncome[N]}$$

$$FuturePB = \frac{FV \times Shares}{Equity[N]}$$

A traditional way of calculating terminal value or perpetuity value uses the final year free cash flow and assumes it will grow to perpetuity. This method of calculating future value per share is as follows:

$$FV = \frac{FCF[N] \times (1+g)}{(r_e - g) \times Shares} =$$

$$\frac{(NetIncome[N] - Equity[N] + Equity[N-1]) \times (1+g)}{(r_e - g) \times Shares}$$

A disadvantage of this method is that if the forecast input by the user assumes strong growth for the final year of the forecast N, then this formula is an under-estimate of the true future value because FCF[N] may be small.

Also, traditional calculations calculate terminal value or perpetuity value without inferring what the future value per share or future price-earnings or price-book ratios are. Calculating future price-earnings ratio and price-book ratios has two advantages:

By comparing future price-earnings and price-book ratios with historical averages of the company and other companies, one can sanity check the value of the perpetuity or terminal value.

By comparing future price-earnings ratio to the current price-earnings ratio, one can relate the impact of the change in price-earnings ratio to that of the expected shareholder returns. This will be described below.

III. Computing Fair Value Per Share

The computation of fair value per share is performed as follows:

$$V = \frac{\sum_{i=1}^{N} \frac{FCF[i]}{(1+r_e)^i}}{Shares} + \frac{FV}{(1+r_e)^N}$$

The decomposition of fair value into its components is performed as follows:

TABLE 3

| | |
|---|---|
| A = Book Value per Share | BookEquity[0]/Shares |
| B = Value creation from year 1 to N | $\frac{\sum_{i=1}^{N} AE[n]}{(1+r_e)^i \times shares}$ |
| C = Value creation after year N | $\frac{FV - BookEquity[N]/Shares}{(1+r_e)^N}$ |
| D = Total Fair Value per Share | $\frac{\sum_{i=1}^{N} \frac{FCF[i]}{(1+r_e)^i}}{Shares} + \frac{FV}{(1+r_e)^N}$ |

One can prove mathematically that A+B+C=D

IV. Computing Expected Return and its Decomposition

Breakdown of expected return into its components will now be described.

Similar to the Return Decomposition Module, the total expected return is computed using the IRR function for the set of cash flows CF[n] where:

CF[0]=−P

CF[$n$]=FCF[$n$]/shares=(NetIncome[$n$]−BookEquity[$n$]+BookEquity[$n$−1])/Shares for n=1, 2, ... N−1

CF[$N$]=FCF[$N$]/Shares+FV=(NetIncome[$N$]−BookEquity[$N$]+BookEquity[$N$−1])/Shares+FV Where P is today's stock price.

The formulae for expected return and its decomposition into its five components are as follows:

TABLE 4

| Term | Formula |
|---|---|
| Total Annualized Shareholder Return | IRR[CF[n]] |
| No Growth Earnings Yield | $\frac{NetIncome[0]}{P \times Shares}$ |
| Capital Needs | $-\left(\sqrt[N]{\frac{BookEquity[N]}{BookEquity[0]}} - 1\right) \cdot \frac{BookEquity[0]}{P \times Shares}$ |

TABLE 4-continued

| Term | Formula |
|---|---|
| Earnings Growth | $\left(\sqrt[N]{\frac{\text{NetIncome}[N]}{\text{NetIncome}[0]}} - 1\right) \cdot \left(1 + \frac{\text{NetIncome}[0]}{P \times \text{Shares}}\right)$ |
| Change in Price-earnings ratio | $\left(\sqrt[N]{\frac{FV}{P}} - \sqrt[N]{\frac{\text{NetIncome}[N]}{\text{NetIncome}[0]}}\right)$ |
| Timing Difference | $\text{IRR}[CF[n]] - \frac{\text{NetIncome}[0]}{P \times \text{Shares}} + \left(\sqrt[N]{\frac{\text{BookEquity}[N]}{\text{BookEquity}[0]}} - 1\right).$ $\frac{\text{BookEquity}[0]}{P \times \text{Shares}} - \left(\sqrt[N]{\frac{\text{NetIncome}[N]}{\text{NetIncome}[0]}} - 1\right).$ $\left(1 + \frac{\text{NetIncome}[0]}{P \times \text{Shares}}\right) - \left(\sqrt[N]{\frac{FV}{P}} - \sqrt[N]{\frac{\text{NetIncome}[N]}{\text{NetIncome}[0]}}\right)$ |

An advantage of this decomposition is one can understand the expected return in investing the stock and see where it comes from.

In particular, one can see the negative implications of investing a stock when the price-earnings is very high. Price-earnings ratio of stocks are high when investors expect very high growth in earnings. However, if earnings growth is insufficient to justify the expected decline in price-earnings ratio, then the returns from investing in this stock may not be high. Also, earnings growth per se may not create investment returns if the company must invest much capital to grow. The capital needs term is a measure of how much capital is required to grow the business.

Figure 8:
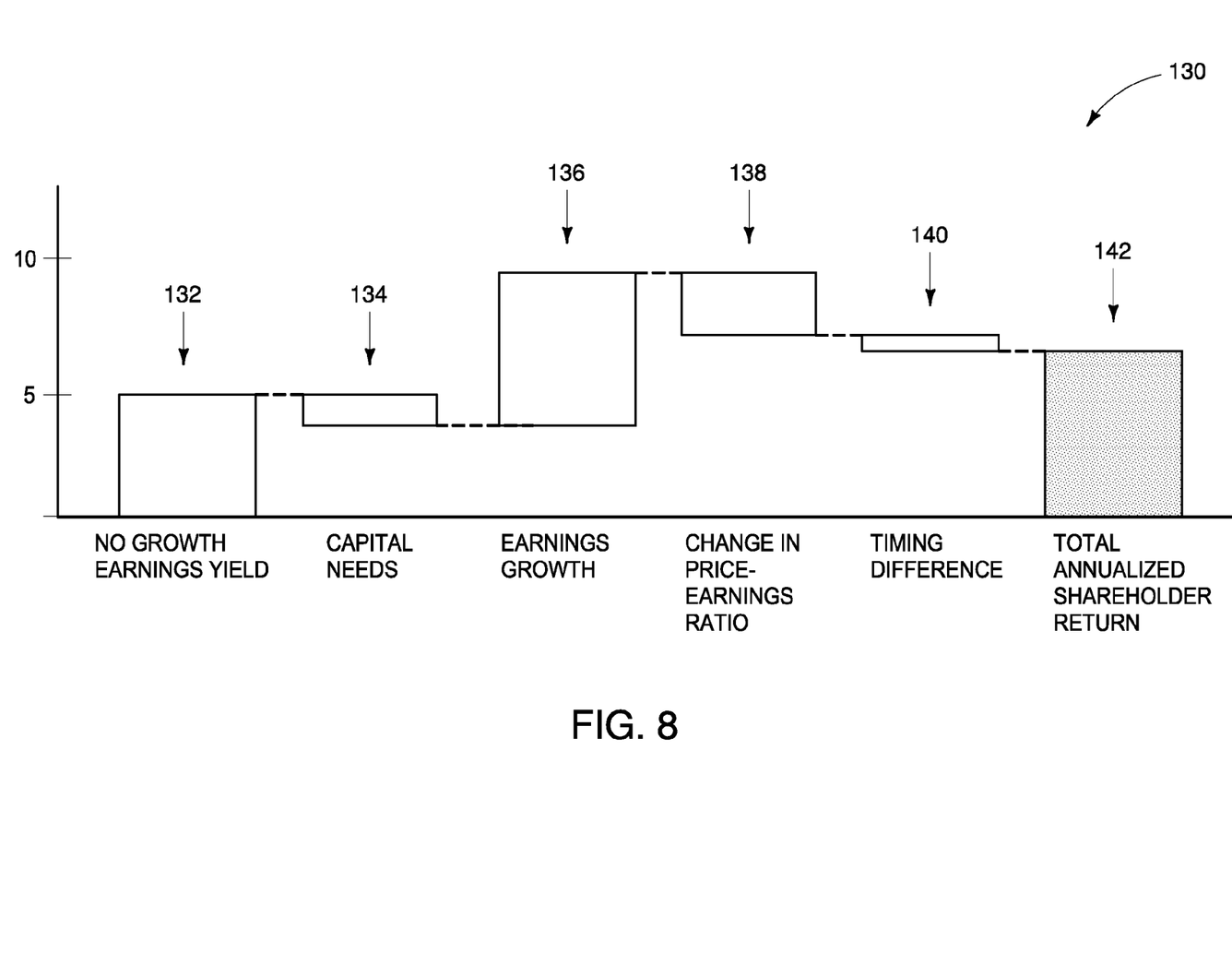
FIG. 8 is a graph, generated by the system of FIG. 1, showing decomposition of expected return, in accordance with various embodiments.

Similar to output chart module 34, output chart module 40 of FIG. 2 outputs, in various embodiments, the decomposition 130 of the expected returns to investing in a stock in a waterfall chart as shown in FIG. 8. More particularly, FIG. 8 shows No Growth Earnings Yield 132, Capital Needs 134, earnings growth 136, change in price-earnings ratio 138, timing difference 140, and total annualized shareholder return 142.

Figure 9:
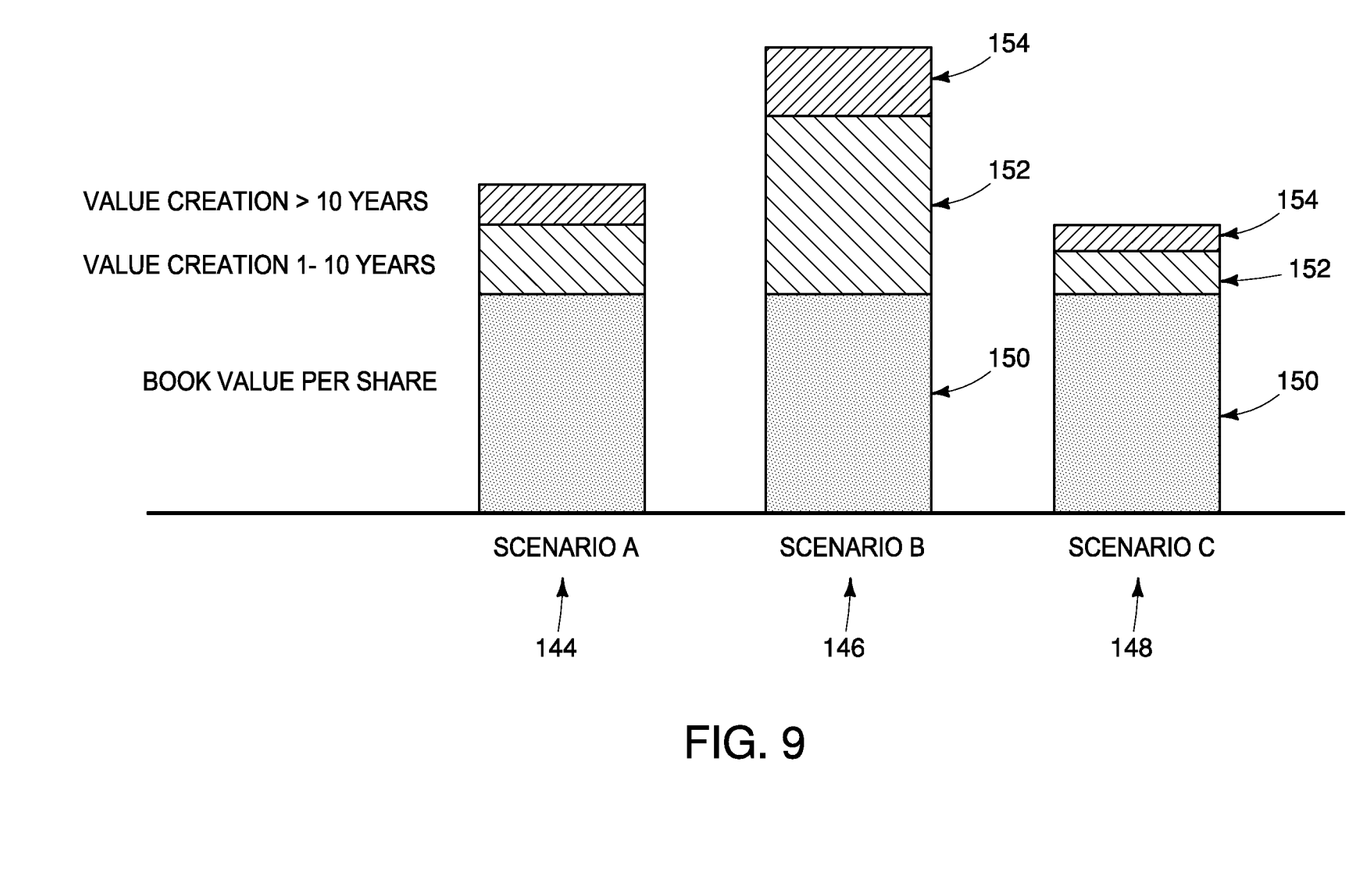
FIG. 9 is a graph, generated by the system of FIG. 1, showing decomposition of fair value, in accordance with various embodiments.

The output chart module 40 of FIG. 2, in various embodiments, also or alternatively outputs a fair value decomposition as shown in FIG. 9. Fair value per share and decomposition into components is rendered. More particularly, for different scenarios 144, 146, and 148, the output chart module 40 decomposes into Book Value Per Share 150, Value Creation 1-10 Years 152, and Value Creation >10 years 154, in the illustrated embodiment.

While some embodiments disclosed herein are implemented in software, alternative embodiments comprise hardware, such as hardware including digital logic circuitry. Still other embodiments are implemented in a combination of software and digital logic circuitry.

Various embodiments comprise a computer-usable or computer-readable medium, such as a hard drive, solid state memory, flash drive, floppy disk, CD (read-only or rewritable), DVD (read-only or rewritable), tape, optical disk, floptical disk, RAM, ROM (or any other medium capable of storing program code) bearing computer program code which, when executed by a computer or processor, or distributed processing system, performs some or all of the functions described above.

Some embodiments provide a carrier wave or propagation signal, medium, or device embodying such computer program code for transfer of such code over a network or from one device to another.

In compliance with the patent statutes, the subject matter disclosed herein has been described in language more or less specific as to structural and methodical features. However, the scope of protection sought is to be limited only by the following claims, given their broadest possible interpretations. The claims are not to be limited by the specific features shown and described, as the description above only discloses example embodiments.

I claim:

1. A system for analyzing a security, the system comprising:
   a processor;
   an input module configured to cause a graphical user interface to be rendered on a user's client machine, the interface including a graph of stock price versus trading dates, with price being indicated on a first axis and trading dates being indicated on a second axis, the interface being configured to input a first trading date by a user interacting with the graph and actuating on the graph in a location, along the second axis, representing the first trading date, the interface being configured to input a second trading date by a user interacting with the graph and actuating on the graph in a location, along the second axis, representing the second trading date;
   a return decomposition module configured to compute, using the processor, shareholder return between the first trading date and second trading date, and to decompose the shareholder return into: zero growth earnings yield, earnings and yield growth, capital needs for growth, change in price-earnings ratio, and timing differences; and
   an output module configured to display the decomposition on the user's client machine in the form of a chart.

2. A system in accordance with claim 1 and wherein the output module is configured to display the decomposition in the form of a waterfall chart.

3. A system in accordance with claim 1 and wherein the input module causes the graphical user interface to display a cursor shape that moves along the graph at least from the first trading date to the second trading date at least while the user is selecting the first and second inputs.

4. A system in accordance with claim 1 and wherein the input module causes an area under the graph to be highlighted between the first trading date and the second trading date after the first and second trading dates are input.

5. A system for analyzing a security, the system comprising:
   a processor;
   an input module configured to cause a graphical user interface to be rendered on a user's client machine, the interface including a table including a plurality of cells respectably capable of being both an input and output, wherein the cells of the table include inputs for valuation of a security based on one of cash flow to equity holders and cash flow to both equity holders and debt holders;
   a forecast and valuation module configured to use inputs from the input module and to compute, using the processor, book value per share, value creation through a range of years up to a year N, value creation after year N, and total fair value per share; and
   an output module configured to render a graph of expected return decomposition broken down into zero growth earnings yield, capital needs for growth, earnings and yield growth, change in price-earnings ratio and timing differences, using inputs from the table.

6. A system in accordance with claim 5 and wherein the cells of the table include inputs for valuation of a security based on cash flow to equity holders and not debt holders.

7. A system in accordance with claim 5 and wherein the cells of the table include inputs for valuation of a security based on cash flow to both equity holders and debt holders.

8. A system in accordance with claim 5 wherein the table includes entries for at least three of revenue growth, revenue, net income margin, net income, book equity/revenue, and incremental book equity/revenue.

9. A system in accordance with claim 5 wherein the table includes entries for at least three of revenue growth, revenue, NOPAT margin, NOPAT, invested capital/revenue, incremental invested capital/revenue, corporate debt, corporate debt interest rate, and marginal tax rate for interest rate deductions.

10. A system in accordance with claim 5 and further comprising a second input module configured to cause a graphical user interface to be rendered on a user's client machine, the interface including a graph of stock price versus trading dates, with price being indicated on a first axis and trading dates being indicated on a second axis, the interface being configured to input a first trading date by a user interacting with the graph and actuating on the graph in a location, along the second axis, representing the first trading date, the interface being configured to input a second trading date by a user interacting with the graph and actuating on the graph in a location, along the second axis, representing the second trading date.

11. A system in accordance with claim 10 and further comprising a return decomposition module configured to compute, using the processor, shareholder return between the first trading date and second trading date, and to decompose the shareholder return into: zero growth earnings yield, earnings and yield growth, capital needs for growth, change in price-earnings ratio, and timing differences.

12. A method of analyzing a security, the method comprising:
causing a graphical user interface to be rendered on a user's client machine, the interface including a graph of stock price versus trading dates, with price being indicated on a first axis and trading dates being indicated on a second axis, the interface being configured to input a first trading date by a user interacting with the graph and actuating on the graph in a location, along the second axis, representing the first trading date, the interface being configured to input a second trading date by a user interacting with the graph and actuating on the graph in a location, along the second axis, representing the second trading date;
computing, using a processor, shareholder return between the first trading date and second trading date, and decomposing the shareholder return into components including zero growth earnings yield, earnings and yield growth, capital needs for growth, change in price-earnings ratio, and timing differences;
displaying the decomposition on the user's client machine in the form of a waterfall chart;
rendering a table on the user's client machine, the table including a plurality of cells respectably capable of being both an input and output, wherein the cells of the table include inputs for valuation of a security based on one of cash flow to equity holders and cash flow to both equity holders and debt holders; and
rendering a graph of expected return decomposition broken down into book value per share, value creation through a range of years up to year N, and value creation after year N, using inputs from the table.

13. A method in accordance with claim 12 and displaying, with the graphical user interface, a cursor shape that moves along the graph at least from the first trading date to the second trading date at least while the user is selecting the first and second inputs.

14. A method in accordance with claim 12 and displaying, with the graphical user interface, a cursor square that moves along the graph at least from the first trading date to the second trading date at least while the user is selecting the first and second inputs.

15. A method in accordance with claim 12 and displaying, with the graphical user interface, a cursor shape that moves along the graph at least from the first trading date along with the cursor after the user selects the first input.

16. A method in accordance with claim 12 and wherein the input module causes an area under the graph to be highlighted between the first trading date and the second trading date after the first and second trading dates are input.

17. A method in accordance with claim 12 wherein the table includes entries for at least three of revenue growth, revenue, net income margin, net income, book equity/revenue, and incremental book equity/revenue.

18. A method in accordance with claim 12 wherein the table includes entries for at least three of revenue growth, revenue, NOPAT margin, NOPAT, invested capital/revenue, incremental invested capital/revenue, corporate debt, corporate debt interest rate, and marginal tax rate for interest rate deductions.

19. A method in accordance with claim 12 and further comprising using inputs from the second input module and to compute book value per share, value creation through a range of years up to a year N, value creation after year N, and total fair value per share.

20. A memory bearing computer program code which, when executed in a computer, causes the computer to perform the method of claim 12.

* * * * *